United States Patent [19]
Bryan, Jr.

[11] 3,791,468
[45] Feb. 12, 1974

[54] DYNAMIC LOAD INCREASING AUTOMOBILE BUMPER

[76] Inventor: John F. Bryan, Jr., 3212 Mapleleaf Cir., Dallas, Tex. 75233

[22] Filed: Sept. 16, 1971

[21] Appl. No.: 181,112

[52] U.S. Cl................ 180/1 FV, 105/2 A, 188/270, 293/1, 293/63, 293/64, 293/69, 293/70, 296/1 S
[51] Int. Cl..... B60r 19/02, B61f 19/04, B62d 37/02
[58] Field of Search .... 105/2 A, 2 R; 293/1, 60, 63, 293/69 R, 62; 296/1 S; 180/1 FV; 188/270

[56] References Cited
UNITED STATES PATENTS

| | | | |
|---|---|---|---|
| 2,036,560 | 4/1936 | Backus | 296/1 S |
| 2,085,694 | 6/1937 | Cordingley | 293/63 X |
| 2,979,165 | 4/1961 | McCambridge | 296/1 S X |
| 2,231,312 | 2/1941 | Ache | 293/69 R X |
| 2,231,313 | 2/1941 | Ache | 293/69 R |
| 2,796,286 | 6/1957 | Barenyi | 293/63 X |
| 3,618,998 | 11/1971 | Swauger | 296/1 S |
| 1,858,743 | 5/1932 | Langstreth | 293/62 X |
| 3,455,594 | 7/1969 | Hall et al. | 296/1 S |

Primary Examiner—Gerald M. Forlenza
Assistant Examiner—Howard Beltran
Attorney, Agent, or Firm—Richards, Harris and Medlock

[57] ABSTRACT

In an automobile bumper configuration, a front bumper is supported above the low front end of an automobile body at the height required by Federal regulations. The bumper has a thin cross section so as not to impede vision and is shaped as an airfoil which is oriented to force the front end of the automobile downwardly in response to air flowing rearwardly relative to the front of the automobile. The bumper is supported on the body by structure which also encloses the headlights of the automobile.

11 Claims, 3 Drawing Figures

INVENTOR:
JOHN F. BRYAN, JR.

Richards, Harris & Hubbard
ATTORNEYS

3,791,468

DYNAMIC LOAD INCREASING AUTOMOBILE BUMPER

BACKGROUND AND SUMMARY OF THE INVENTION

This invention relates to an automobile bumper configuration, and more particularly to a front bumper configuration for automobiles having low front ends.

As is well known, one of the most prevalent trends in automobile design is toward the use of automobile bodies having extremely low front ends. This is true not only in racing cars, but also in sports and sports-type cars intended for non-competition use. A concurrent and perhaps related trend is towards the use of aerodynamic structures for imposing downward thrust and thereby increasing traction. As is also well known, the Federal Government is currently propagating automobile design regulations intended to increase highway safety. One aspect of this Federal program is a proposed standard height for the bumpers of all automobiles.

The present invention comprises a novel automobile bumper configuration which accommodates the foregoing design trends and proposed highway regulations. In accordance with the preferred embodiment of the invention, a front bumper is supported above the low front end of an automobile body and at the required height. The bumper preferably comprises an airfoil oriented to impose a downward thrust on the automobile body during forward movement of the automobile. The supporting structure for the front bumper may enclose headlights, if desired.

DESCRIPTION OF THE DRAWING

A more complete understanding of the invention may be had by referring to the following Detailed Description when taken in conjunction with the accompanying Drawing, wherein.

DETAILED DESCRIPTION

Figure 1:
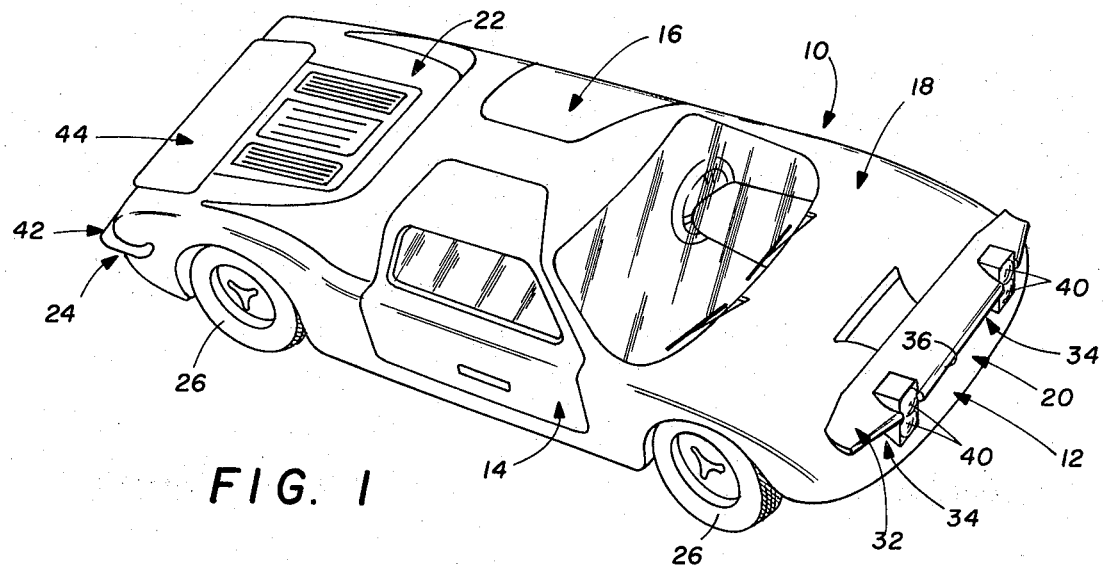
FIG. 1 is a perspective view of an automobile having a bumper configuration comprising the preferred embodiment of the present invention.

Referring now to the Drawings, there is shown an automobile 10 incorporating a bumper configuration 12 comprising the preferred embodiment of the present invention. The automobile 10 includes a body 14 comprising a cockpit 16 which is generally centrally disposed longitudinally of the automobile 10, a forward portion 18 which slopes downwardly from the cockpit 16 to a low front end 20, and a rear portion 22 which extends from the cockpit 16 to a rear end 24. The body 14 is supported on four wheels 26 for movement along a surface 28. The automobile 10 further includes an engine 30 which is mounted on the body 14 and which is operable through two of the wheels 26 to propel the automobile 10 along the surface 28.

The bumper configuration 12 comprises a front bumper 32 which is supported above the low front end 20 of the body 14 of the automobile 10 by a pair of bumper support members 34. The bumper 32 comprises the forwardmost component of the automobile 10 and includes a leading edge 36 which is positioned at a height H above the surface 28 as required by Federal highway regulations. The bumper 32 has a thin, wide, i.e., flat, cross section so that it does not interfere with vision from the cockpit 16 and preferably has slightly concave and slightly convex upper and lower surfaces, respectively. By this means the bumper 32 functions as an airfoil to force the front portion 18 of the body 14 downwardly in response to air flowing rearwardly along the body 14, that is, during forward motion of the automobile 10 under the action of the engine 30.

Figure 3:
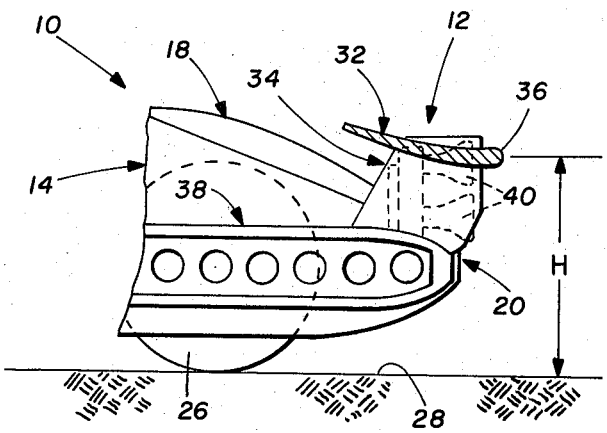
FIG. 3 is an enlarged sectional view further illustrating the bumper configuration.

As is best shown in FIG. 3, the bumper support members 34 comprise rigid members which extend upwardly from the chassis 38 of the automobile 10 to support the front bumper 32. The bumper support members 34 are preferably of sufficient size to enclose conventional headlights 40. By this means the headlights 40 as well as the bumper 32 of the automobile 10 are positioned at the height required by Federal highway regulations.

Figure 2:
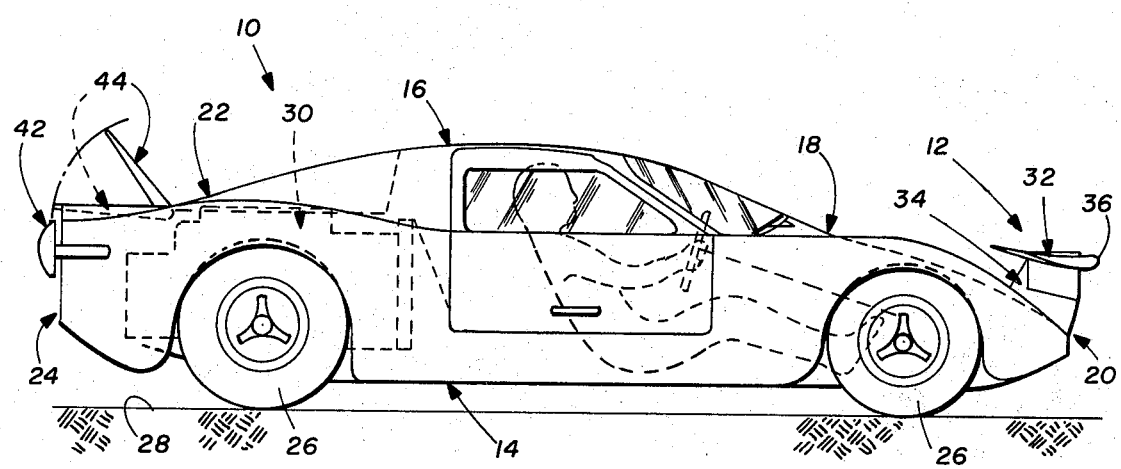
FIG. 2 is a side view of the automobile shown in FIG. 1.

Referring now particularly to FIG. 2, the automobile 10 further includes a rear bumper 42. The rear bumper 42 comprises the rearwardmost component of the automobile 10 and is positioned at the same height as the front bumper 32. The automobile 10 may also be equipped with a member 44 mounted for pivotal movement from the position shown in dashed lines in FIG. 2 to the position shown in full lines in FIGS. 2. When the member 44 is in the latter position it functions to impose a downwardly directed force on the rear portion 22 of the automobile 10 and also functions to create a turbulence which acts as a brake. In accordance with the preferred embodiment of the invention the member 44 forms part of the body 14 of the automobile 10 so that when the member 44 is in the position shown in full lines in FIG. 2, access is provided to at least the service components of the engine 30.

Those skilled in the art will realize that bumper configurations incorporating the present invention are readily adapted to numerous automobile designs. For example, the present invention may be employed in automobiles comprising the conventional separate body and chassis construction or in automobiles comprising a unitary body-chassis. Similarly, automobiles incorporating the invention may comprise sedans, coupes, open top vehicles, or convertibles. Furthermore, although a rear engine automobile has been shown in the Drawings, the present invention is readily adapted to automobiles having front or side mounted engines. Other modifications will readily suggest themselves to those skilled in the art.

From the foregoing it will be understood that in accordance with the present invention, an automobile having a low front end is provided with a front bumper comprising the extreme forwardmost structural element of the automobile and positioned above the low front end of the body at the height required by Federal regulations. The front bumper preferably comprises an airfoil adapted to force the front end of the automobile downwardly during forward motion of the automobile. The use of the invention is highly advantageous over the prior art in that it accommodates both the current trends in automobile design and the proper bumper height as required by proposed Federal highway regulations.

Although the preferred embodiment of the invention has been illustrated in the Drawing and described in the foregoing Detailed Description, it will be understood that the present invention is not limited to the embodiment disclosed, but is capable of rearrangement, modification and substitution of parts and elements without departing from the spirit of the invention.

What is claimed is:

1. In an automobile of the type including a body having a cockpit and having a forward portion which slopes downwardly from the cockpit to a low front end, wheel means for supporting the body, and engine means mounted on the body for propelling the automobile, the improvement comprising:
 a front bumper comprising the extreme forwardmost structural element of the automobile; and
 means extending generally vertically upwardly from the body for supporting the front bumper above the low front end thereof and with an open space extending between the body and the front bumper;
 said front bumper functioning as airfoil means for forcing the front end downwardly in response to air flow over the bumper during forward motion of the automobile.

2. The improvement according to claim 1 wherein the front bumper has a thin cross section so that it does not impede vision from the cockpit.

3. The automobile according to claim 1 further including headlights mounted in the bumper supporting means.

4. The automobile according to claim 1 further including a rear bumper comprising the extreme rearwardmost structural element of the automobile and means supporting the rear bumper on the body at the same height as the front bumper.

5. An automobile comprising:
 body means including a cockpit, a forward portion which slopes downwardly to a low front end, and a rearward portion which extends to a rear end;
 wheel means located between the front and rear ends for supporting the body on a surface;
 an engine mounted on the body and operatively connected to the wheel means for propelling the automobile over the surface;
 front bumper means comprising an airfoil oriented to impose a downwardly directed force on the front portion of the body in response to air flowing rearwardly relative to the body; and
 means for supporting the front bumper means at a predetermined height above the surface and spaced a predetermined distance above the low front end of the body.

6. The automobile according to claim 5 wherein the front bumper is thin so as not to interfere with vision from the cockpit of the body.

7. The automobile according to claim 5 further comprising at least one structural member for supporting the bumper on the body and at least one headlight mounted in the structural member.

8. The automobile according to claim 5 wherein the engine is mounted in the rearward portion of the body and wherein the rearward portion of the body includes a member supported for pivotal movement from a normal position to a position wherein it performs an aerodynamic function and provides access to the engine.

9. An automobile comprising:
 body means including a centrally disposed cockpit, a forward portion which slopes downwardly from the cockpit to a low front end, and a rearward portion which extends from the cockpit to a rear end;
 means including a plurality of wheels located between the front and rear ends for supporting the body on a surface;
 engine means mounted on the body for propelling the automobile over the surface;
 at least one structural member extending generally vertically upwardly from the low front end of the body; and
 front bumper means supported by said structural member in a spaced-apart relationship above the low front end of the body and functioning as an airfoil means having a thin, wide cross section and oriented to force the body downwardly in response to air flow over the bumper during forward movement of the automobile along the surface under the action of the engine.

10. The automobile according to claim 9 further including at least one headlight mounted in the structural member and directed forwardly of the automobile and a rear bumper supported on the body at the same predetermined height above the surface as the front bumper.

11. An automobile comprising:
 chassis means;
 body means mounted on the chassis means and including a low front end portion;
 wheel means supporting the chassis means and the body means mounted thereon for movement over a surface;
 engine means mounted on the chassis means and operatively connected to the wheel means for propelling the automobile;
 bumper support means extending vertically from the front portion of the chassis means; and
 front bumper means supported by the bumper support means above the low front end of the body means to define a predetermined space therebetween and comprising airfoil means for forcing the front end of the body means downwardly in response to air flow over the bumper means during forward movement of the automobile along the surface under the action of the engine means.

* * * * *